June 16, 1931.  C. T. SMITH  1,810,735
HOSE COUPLING
Filed May 18, 1928

Inventor
CHARLES T. SMITH
By Milburn & Milburn
Attorneys

Patented June 16, 1931

1,810,735

UNITED STATES PATENT OFFICE

CHARLES T. SMITH, OF CLEVELAND HEIGHTS, OHIO

HOSE COUPLING

Application filed May 18, 1928. Serial No. 278,851.

This invention relates to an improved hose coupling.

The objects of the present invention are to devise a coupling with means for effectively sealing the same in a comparatively simple manner; to provide means to prevent the back pressure from suddenly forcing the coupling members apart upon disconnecting the same; to provide an improved form and arrangement of valve together with an improved means for manipulating the same.

Other objects will appear from the following description and claim when considered together with the accompanying drawings.

Figure 1:
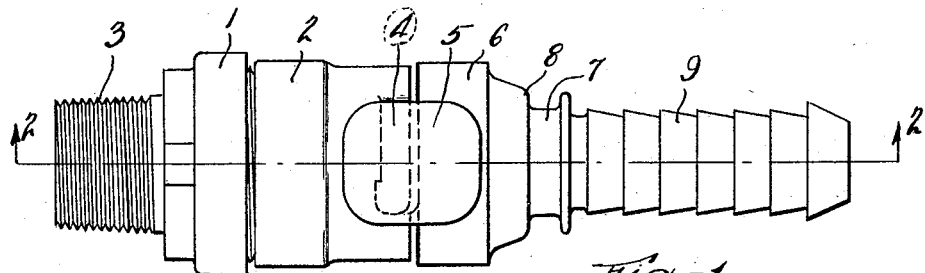
Figure 2:
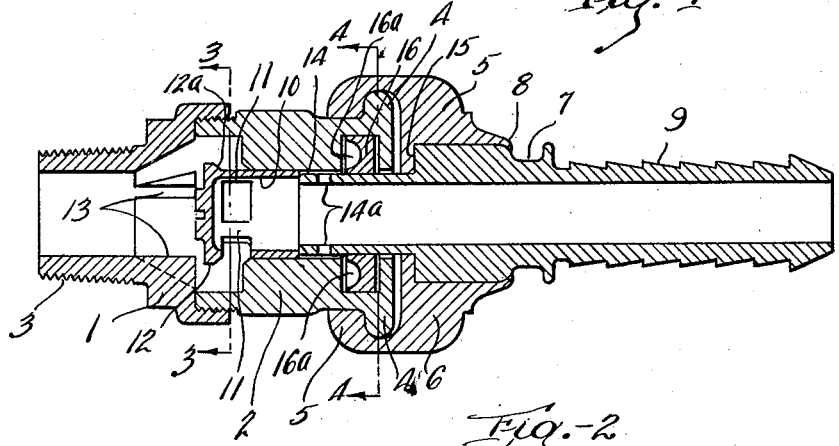
Figure 3:
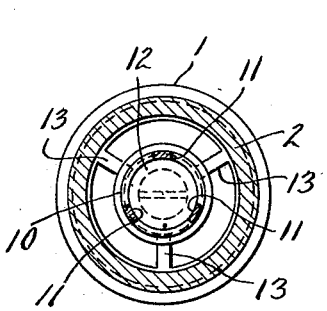
Figure 4:
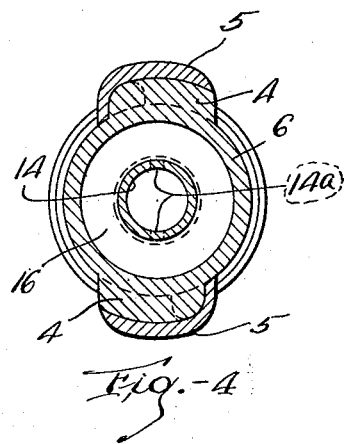

Fig. 1 shows my improved coupling in elevation; Fig. 2 is a sectional view taken on line 2—2 of Fig. 1; and Figs. 3 and 4 are sectional views taken on lines 3—3 and 4—4, respectively, of Fig. 2.

The valve end of the coupling comprises the members 1 and 2 which are threaded together, the member 1 having its one end threaded at 3 for attachment to the air line, while the member 2 has its other end provided with lugs 4 which form a bayonet lock with the companion socket portions 5 on the other part of the coupling. The corners of the lugs 4 are squared.

The other part of the coupling comprises the members 6 and 7. The member 6 has the socket portion 5 formed thereon and receives the other member 7 which extends therethrough. A swivel connection is provided between the parts 6 and 7 by spinning over the portion 8 about a suitably provided shoulder on the member 7. The hose is adapted to be attached to the neck 9 which is formed on the portion 7.

The valve member is in the form of an annular collar or ring portion 10 from which extend the equi-spaced legs or web portions 11 which terminate in and join with the closed end portion 12. The portion 12 has a beveled portion 12ª which is adapted for seating engagement with a correspondingly formed seat portion provided on the portion 2, as clearly illustrated in Fig. 2 of the drawings. The collar portion 10 serves as a means for guiding the valve member in its straight line movement in the opening through the member 2. The lugs 13 are provided upon the inner conical surface of the member 1, there being three such lugs in the present case. The inner edges of these lugs are parallel with the axis of the coupling, and they serve as a means for limiting the opening movement of the valve member, as indicated in Fig. 2.

As a means of opening the valve member, the member 7 is provided with a projecting neck portion 14, which is adapted to engage the collar portion 10, upon coupling the parts together. Then the air or other fluid can pass between the lugs 13, through the openings between the legs 11 and thence through the longitudinal bore through the member 7, as will be clearly understood from Fig. 2. With the present structure, it is possible to turn the member 7 independently of the member 6, at all times and even when the valve is open, this being made possible by the particular structure and arrangement of parts including the swivel connection, above referred to. It will be noted that the member 7 has an extended bearing engagement in the member 6, as indicated in Fig. 2, and that, with the annular shoulder 15, the members 6 and 7 are permanently connected together as a single unit. The extended bearing referred to, prevents angular cocking of these two members with respect to each other.

As a means of providing a hermetic seal between the parts of the coupling, when in interlocking engagement, an elastic ring 16 of rubber or the like is removably inserted in the correspondingly formed groove in the inner wall of the member 2, near the one end thereof so as to permit insertion of the same. The opening through this ring is slightly smaller than the inside diameter of the member 2 and is also slightly smaller than the outside diameter of the neck portion 14. As will be seen from Fig. 2, the neck portion 14 is slightly smaller than the opening through the member 2. The gasket 16 has an annular channel 16ª to which the pressure of the air or other fluid will find its way when the valve is open. This pressure in the channel 16ª will exert itself both inwardly and outwardly, with the result that the inner and outer walls of the gasket will be very effectively sealed against the neck 14 and the groove wall, respectively. As indicated in the drawing, the depth of the gasket is slightly less than the depth of the groove.

The neck 14 has oppositely disposed outlet openings or ports 14ª at approximately the points indicated in Fig. 2. The purpose of these openings is to afford a means of relieving the back pressure in the hose, upon disengaging the coupling and prior to complete separation of the parts. That is, upon disconnecting the bayonet lock and withdrawing the neck 14 from the member 2 to such point that the openings 14ª are exposed to the outside air, the back pressure will at once be relieved through these openings prior to complete separation of these parts. Thus, there is precluded the danger of the parts being suddenly forced apart.

Because of the relative size of the gasket 16, as above explained, its resiliency serves also as a means of holding the bayonet lock in engagement. The insertion of the neck 14 tends to distort the inner wall of the gasket which, upon release of the parts, will tend to return to its normal condition and thereby exert a certain force for holding the bayonet lock in closed engagement.

The advantages of the present structure will be obvious to those who are familiar with the art to which the present invention relates. Not only is the structure simple, but the parts are effectively sealed against leak. The valve has an extended and dependable slidable engagement. The valve is actuated without the use of any spring, and the hose end of the coupling can be swiveled with ease and without interference with the valve, even when the valve occupies open position. The device is positive and dependable in its action, and all of the parts are readily accessible for assembly or disassembly.

It is to be understood that the present disclosure is merely for purposes of illustration and that modifications of the present form of structure may be devised without departing from the spirit of the present invention. All such modifications are intended to be comprehended by the following claim.

What I claim is:

A hose coupling comprising two members adapted for interlocking connection for the passage of fluid therethrough, a valve in one of said members, the other of said members having a projecting portion adapted for insertion within said one member for opening engagement with said valve, said one member having an annular three wall groove in its inner surface in immediate proximity to the end thereof, and a readily accessible, expansible gasket arranged in said groove and around said projecting portion for sealing the connection, said gasket having an annular channel facing the incoming pressure so as to be exposed to the full and direct pressure of the fluid and being engaged only by said projecting portion and being subject to only radial expansion, whereby the inner and outer walls of the gasket will be maintained in effective sealing engagement between the inner wall of said groove and said projecting portion, respectively.

In testimony whereof, I hereby affix my signature.

CHARLES T. SMITH.